(12) United States Patent
Sipp

(10) Patent No.: US 7,602,076 B1
(45) Date of Patent: Oct. 13, 2009

(54) HYDRO-POWER GENERATING SYSTEM AND METHOD

(76) Inventor: Peter Fox Sipp, 311 Aiken Rd., Apt. G, Asheville, NC (US) 28804

(*) Notice: Subject to any disclaimer, the term of this patent is extended or adjusted under 35 U.S.C. 154(b) by 674 days.

(21) Appl. No.: 11/133,070

(22) Filed: May 18, 2005

Related U.S. Application Data

(63) Continuation-in-part of application No. 10/627,129, filed on Jul. 24, 2003, now abandoned.

(51) Int. Cl.
*F03B 13/00* (2006.01)
*F03B 13/10* (2006.01)
*F03B 13/12* (2006.01)

(52) U.S. Cl. ............... 290/54; 290/43; 290/53

(58) Field of Classification Search ............ 290/53, 290/54, 43
See application file for complete search history.

(56) References Cited

U.S. PATENT DOCUMENTS

| | | | | |
|---|---|---|---|---|
| 646,713 A | | 4/1900 | Symons | 416/86 |
| 1,706,441 A | * | 3/1929 | Daughs | 212/309 |
| 2,097,286 A | * | 10/1937 | McGee | 290/54 |
| 3,018,893 A | * | 1/1962 | Collie et al. | 210/159 |
| 3,698,163 A | * | 10/1972 | Kelpin | 56/9 |
| 3,847,105 A | * | 11/1974 | Kelpin | 440/37 |
| 3,882,320 A | * | 5/1975 | Schmeller | 290/43 |
| 3,884,359 A | * | 5/1975 | Suverkrop | 212/289 |
| 3,978,345 A | * | 8/1976 | Bailey | 290/54 |
| 3,986,787 A | * | 10/1976 | Mouton et al. | 415/7 |
| 4,001,596 A | | 1/1977 | Kurtzbein | 290/54 |
| 4,023,041 A | | 5/1977 | Chappell | 290/53 |
| 4,038,821 A | | 8/1977 | Black | 60/398 |
| 4,039,847 A | * | 8/1977 | Diggs | 290/42 |
| 4,053,253 A | | 10/1977 | Coffer | 415/5 |
| 4,095,918 A | * | 6/1978 | Mouton et al. | 415/7 |
| 4,104,536 A | | 8/1978 | Gutsfeld | 290/54 |
| 4,137,005 A | | 1/1979 | Comstock | 415/24 |
| 4,239,976 A | | 12/1980 | Collard | 290/42 |
| 4,270,056 A | * | 5/1981 | Wright | 290/54 |
| 4,296,602 A | | 10/1981 | Hales et al. | 60/398 |
| 4,301,377 A | * | 11/1981 | Rydz | 290/43 |
| 4,310,277 A | * | 1/1982 | Robinson | 414/141.7 |
| 4,352,023 A | | 9/1982 | Sachs et al. | 290/42 |
| 4,359,164 A | * | 11/1982 | Triplett | 212/294 |
| 4,359,868 A | | 11/1982 | Slonim | 60/501 |
| 4,363,411 A | * | 12/1982 | Blair et al. | 212/308 |
| 4,368,392 A | | 1/1983 | Drees | 290/54 |
| 4,383,797 A | | 5/1983 | Lee | 415/7 |
| 4,408,455 A | | 10/1983 | Montgomery | 60/505 |
| 4,417,664 A | * | 11/1983 | Gordon | 212/309 |
| 4,434,375 A | | 2/1984 | Taylor | 290/53 |

(Continued)

FOREIGN PATENT DOCUMENTS

DE 3324672 A1 1/1985

*Primary Examiner*—Nicholas Ponomarenko
*Assistant Examiner*—Pedro J Cuevas
(74) *Attorney, Agent, or Firm*—Carter, Schnedler & Warnock, P.A.

(57) ABSTRACT

A hydro-power generating system including an anchor adjacent to a river, a platform floating on the river, and an arm assembly connecting the anchor to the platform, the arm assembly including a plurality of arms connected together such that the level of the platform may vary directly with the level of the river.

9 Claims, 4 Drawing Sheets

U.S. PATENT DOCUMENTS

| | | | | |
|---|---|---|---|---|
| 4,436,480 A | | 3/1984 | Vary | 415/211.1 |
| 4,442,943 A | * | 4/1984 | Triplett | 212/309 |
| 4,464,080 A | * | 8/1984 | Gorlov | 405/76 |
| 4,495,424 A | | 1/1985 | Jost | 290/53 |
| 4,498,294 A | | 2/1985 | Everett | 60/496 |
| 4,514,644 A | * | 4/1985 | Westling | 290/53 |
| 4,516,033 A | | 5/1985 | Olson | 290/54 |
| 4,519,724 A | | 5/1985 | Ribas | 403/345 |
| 4,590,386 A | | 5/1986 | Wiggs | 290/54 |
| 4,598,210 A | | 7/1986 | Biscomb | 290/43 |
| 4,609,826 A | | 9/1986 | Suroff | 290/1 R |
| 4,622,471 A | * | 11/1986 | Schroeder | 290/42 |
| 4,625,124 A | | 11/1986 | Ching-An | 290/42 |
| 4,636,141 A | * | 1/1987 | Sedlacek | 416/86 |
| 4,661,716 A | | 4/1987 | Chu | 290/53 |
| 4,715,776 A | * | 12/1987 | Benesh | 415/4.1 |
| 4,717,831 A | | 1/1988 | Kikuchi | 290/53 |
| 4,722,665 A | | 2/1988 | Tyson | 416/84 |
| 4,737,070 A | | 4/1988 | Horiuchi et al. | 415/7 |
| 4,818,888 A | * | 4/1989 | Lenoir, III | 290/43 |
| 4,838,735 A | * | 6/1989 | Warner | 405/220 |
| 4,838,757 A | * | 6/1989 | Benesh | 415/4.4 |
| 4,843,249 A | | 6/1989 | Bussiere | 290/53 |
| 4,872,805 A | | 10/1989 | Horiuchi et al. | 415/7 |
| 4,890,976 A | | 1/1990 | Jansson | 415/4.4 |
| 4,907,912 A | * | 3/1990 | Smith | 405/208 |
| 4,979,453 A | * | 12/1990 | Sloan et al. | 114/263 |
| 5,009,568 A | | 4/1991 | Bell | 415/3.1 |
| 5,311,064 A | | 5/1994 | Kumbatovic | 290/53 |
| 5,430,332 A | | 7/1995 | Dunn, Jr. | 290/54 |
| 5,440,175 A | | 8/1995 | Mayo et al. | 290/54 |
| 5,642,984 A | | 7/1997 | Gorlov | 416/176 |
| 5,789,826 A | | 8/1998 | Kumbatovic | 290/53 |
| 5,882,143 A | | 3/1999 | Williams, Jr. | 405/78 |
| 5,906,172 A | * | 5/1999 | Kordes | 114/267 |
| 5,946,909 A | | 9/1999 | Szpur | 60/398 |
| 5,947,678 A | | 9/1999 | Bergstein | 415/3.1 |
| 6,125,780 A | * | 10/2000 | Sweetman et al. | 114/264 |
| 6,139,255 A | | 10/2000 | Vauthier | 415/7 |
| 6,406,251 B1 | | 6/2002 | Vauthier | 415/7 |
| 6,551,053 B1 | * | 4/2003 | Schuetz | 415/3.1 |
| 6,568,878 B2 | | 5/2003 | Woodall et al. | 405/25 |
| 6,616,403 B1 | | 9/2003 | Smith et al. | 415/3.1 |
| 6,652,221 B1 | * | 11/2003 | Praenkel | 415/3.1 |
| 6,734,576 B2 | * | 5/2004 | Pacheco | 290/55 |
| 6,755,607 B1 | | 6/2004 | Hester et al. | 415/3.1 |
| 7,105,942 B2 | * | 9/2006 | Henriksen | 290/55 |
| 7,182,034 B2 | * | 2/2007 | Brine | 114/263 |
| 7,223,137 B1 | * | 5/2007 | Sosnowski | 440/3 |
| 7,225,751 B2 | * | 6/2007 | Rueckert | 114/259 |
| 7,462,949 B2 | * | 12/2008 | Coman | 290/54 |
| 2003/0146628 A1 | * | 8/2003 | Sanchez Gomez | 290/54 |
| 2003/0201645 A1 | * | 10/2003 | Pacheco | 290/54 |
| 2005/0017513 A1 | * | 1/2005 | Sipp | 290/54 |
| 2005/0236841 A1 | * | 10/2005 | Henriksen | 290/54 |
| 2005/0257727 A1 | * | 11/2005 | Mogg | 114/44 |
| 2006/0269362 A1 | * | 11/2006 | Henriksen | 405/224 |
| 2006/0272566 A1 | * | 12/2006 | Rueckert | 114/263 |
| 2007/0158253 A1 | * | 7/2007 | Kellett | 210/242.1 |
| 2007/0258771 A1 | * | 11/2007 | Weldon | 405/76 |
| 2008/0018115 A1 | * | 1/2008 | Orlov | 290/54 |
| 2008/0279687 A1 | * | 11/2008 | Hofmann | 416/85 |

* cited by examiner

HYDRO-POWER GENERATING SYSTEM AND METHOD

This application is a continuation-in-part of and claims the benefit of the filing date and priority of U.S. Nonprovisional patent application Ser. No. 10/627,129, filed on Jul. 24, 2003 now abandoned. This invention relates to systems and methods for generating power, such as electrical power. More specifically, it relates to hydro-power generating systems and methods which do not rely on dams.

BACKGROUND OF THE INVENTION

Some of the greatest challenges facing humanity today stem from the by products of energy generation and utilization. Carbon dioxide, sulfur, radioactive waste and other wastes and emissions challenge both human and environmental health and economic profitability of fossil and nuclear energy, making sustainable energy generation not only a preferred "alternative," but also, a necessity. While wind powered generation, worldwide, is the fastest growing form of new generating capacity, it, and solar, are intermittent generating sources. Hydroelectric generation has long stood as a reliable, constant source of renewable power generation that produces no waste or emissions.

The sun's energy and Earth's gravity provide the sustaining cycle for freshwater hydro-mechanical and hydroelectric generating systems. The sun shines on Earth's oceans, causing evaporation and distillation of saltwater. Clouds travel and freshwater rains down on our lands. Gravity pulls this water back to the oceans where the whole cycle is repeated daily. The only "waste" is when this power potential is not utilized.

While in the past century large dams were erected to maximize the kinetic potential of freshwater, these have proved to have consequences that are not always beneficial, including loss of traditional lands, loss and disruption of habitat, both land and aquatic, and even reports of slowing of the axial rotation of Earth, due to the artificial concentration of the great mass in reservoirs. In order to expand the existing hydro-generating capacity at a level that will meaningfully prevent and displace further generation of CO2, radioactive waste and other problematic by-products of fossil/nuclear power sources, it is important to develop systems that will not cause additional "collateral damage." The following desirable attributes are required for such a system:

First: Power generation is from the ambient flow of water without a dam or other diversion.

Second: Potential for large-scale installation to capture the kinetic energy of large rivers, and tides.

Third: Sufficient structural integrity to withstand the forces of moving water and also the forces originating from the capture of kinetic energy, such as torque.

Fourth: Flexibility so that the generating unit can be safeguarded in the event of flood, seasonal usage and for repair.

Fifth: Ability to utilize the energy of relatively shallow waterways with little "head."

Sixth: Designed to be viable given access to only one side of a waterway, since often rivers and streams are the geographic boundary of ownership and/or political territories, while in the same design capturing the greatest kinetic potential in a given stretch of water.

Seventh: Simplicity and durability for power generation for not only decades, but centuries where appropriate.

Eighth: No material is discharged from the system on a routine basis, and any that might be released and be born by water or persist in soil, is non-polluting food-grade material.

Ninth: Completely removable in the event that the site is no longer suitable for power generation; removal generates no hazardous waste, and no contamination remains on the site.

A system that meets all these requirements is also compatible with rehabilitation of previously disturbed (brown field) frontage of waterways.

SUMMARY OF THE INVENTION

A hydro-power generating system is provided which includes a platform floating on a river. The platform in turn includes a waterwheel which rotates on a horizontal axis which is above the level of the river, a solid floor portion beneath the waterwheel, and a bumper screen upstream from the waterwheel for deflecting and filtering waterborne objects.

BRIEF DESCRIPTION OF THE DRAWINGS

The subject matter regarded as the invention is set forth in the appended claims. The invention itself, however, together with further objects and advantages thereof may be better understood in reference to the accompanying drawings.

DETAILED DESCRIPTION

Figure 1:
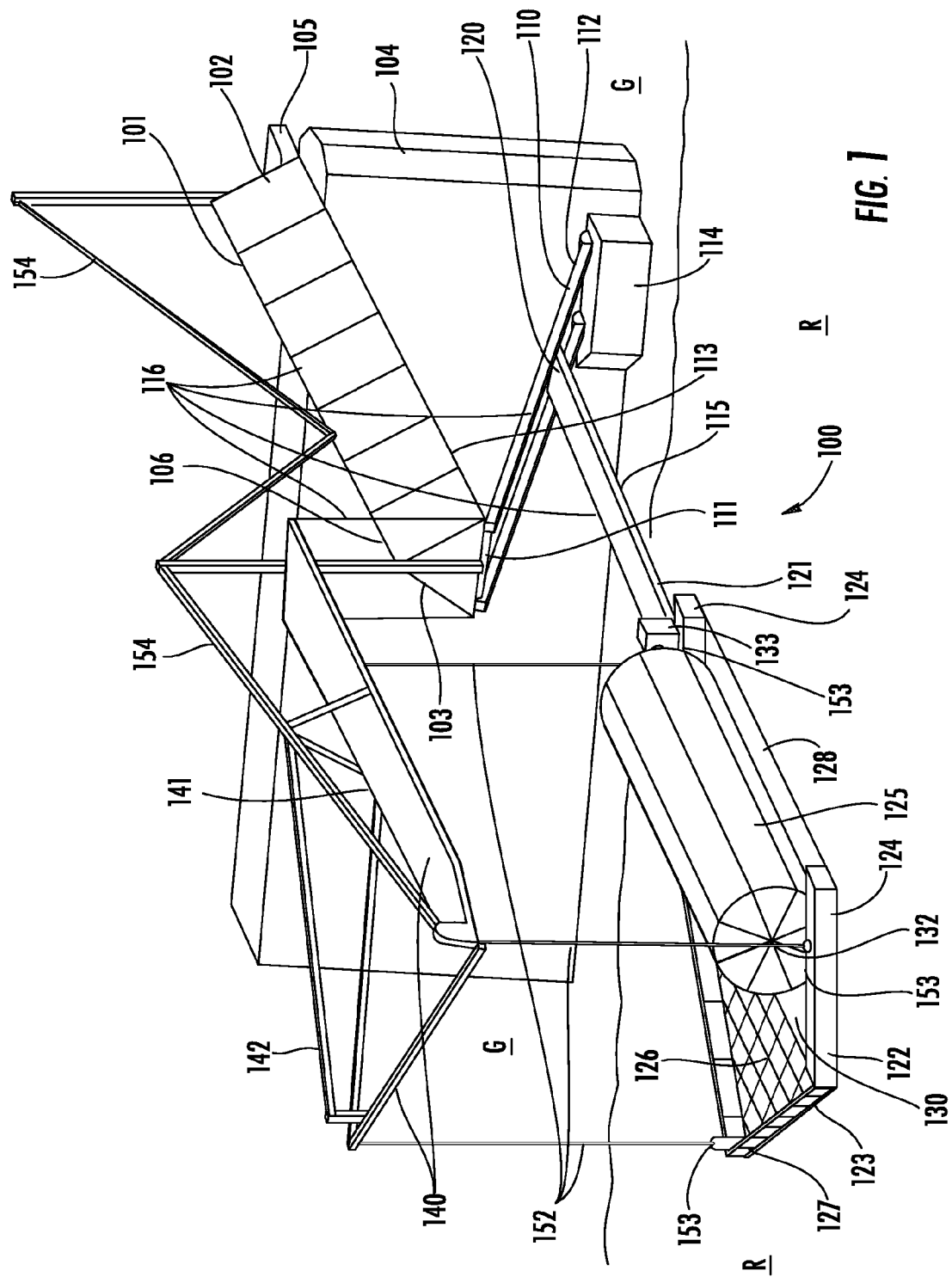
FIG. 1 is a perspective view of a system embodying the invention.

The invention is a unique array of classical elements which, when combined, generate electricity or direct mechanical power from the moving water without a dam or other substantial diversion of the water. The system enables the generating station to be rapidly removed in the event of flood or other seasonal changes and for services to be performed.

The system may include: an anchor with service hull, a jib crane, a water wheel floating on pontoons, a drawbridge, a screen, a speed increaser, and one or more generators, or, in the case of mechanical power generation, a pump and one or more shafts. This overview will focus on electrical generation.

Electricity is generated by the rotation of a large diameter, wide-bladed wheel, or a plurality of wheels, pushed at the bottom by the flow of water, with the axle supported by pontoons. The slow turning of the wheel is translated into electrical power by the use of a speed increaser and generator(s) {or alternator(s)} which may be located on one of the pontoons. This energy may then be fed into electrical lines or storage batteries. The system is stabilized and safeguarded by a drawbridge located upstream of the wheel. The drawbridge supports a protective screen.

The anchor provides robust footing on one side of the waterway. The base for both the crane and drawbridge is attached to the anchor.

The jib crane both positions the wheel while it is at work in the water and is also the means to move the wheel out of the path of danger (such as flood), or move it to land for repair and maintenance. The end of the crane is fitted with a structure designed to allow the wheel to float up on pontoons with rising water, and also with stops to keep the wheel from falling below a minimum level, thus preventing the wheel from scraping the bed of the waterway. At low water, the wheel and its pontoons are suspended from the crane. A catwalk and guided ladder allow access to the wheel, speed increaser and generator.

The drum or wheel is a long, wide cylinder with multiple cup-shaped blades. The wheel may be simple, or divided into sections, such that the blades are off-set to facilitate smooth rotation. The edge of the wheel closest to the anchor is fitted with a gear around the circumference. This gear may be traditional, pegged, or any other device, in every case it interlocks to a very small gear or wheel, which is then belted to the speed increaser on the pontoon adjacent to the wheel gear.

The speed increaser is a series of belts and pulleys on shafts using the classic alternation of small and large diameter rotating pulleys to step up the revolutions per minute from the slow rotation of the wheel in the water up to the rpm required for power generation. In large scale installations a gearbox might be substituted for the speed increaser and perform the same function.

The generator or generators may be situated on the pontoon with the speed increaser and an electric line runs from the generator to storage batteries or through an inverter and then to the electric power grid.

Removing the wheel, pontoons, speed increaser and generator from the waterway is accomplished by first raising the wheel pontoons assembly to the maximum "up" position via winch and pulleys or other mechanisms. The protective screen is also released from the drawbridge and ready to be carried by the crane with the wheel. The crane is then released from the drawbridge and rotated approximately 180 degrees in the downstream direction to deliver the wheel assembly and screen to a safe position above the waterline. In some cases a "wheel rack" may be installed above the water line to hold the wheel assembly, temporarily freeing the crane for other work.

The drawbridge function is to provide stability to the crane and wheel, and to support the protective screen that prevents objects from crashing into the blades of the wheel. Anchored next to and up stream of the jib-crane, the drawbridge is cross-linked to the crane at multiple points when both structures are deployed in the "at work" position. These links are released when the wheel is to be removed from the water.

The drawbridge supports the protective screen that stops any debris or objects from colliding with the wheel. When the wheel is safely raised out of the water, and the screen is clear and unobstructed, it is transferred to supports on the crane and removed from the work area with the wheel. If large objects have collected on the screen, it may be necessary to eject it from the bridge once the wheel is up and out of the way. The screen will be tethered to the anchor, so it can be recovered later.

Once the wheel and the screen have been removed, or the screen ejected, the drawbridge may be lifted, by means of winch and pulleys, or other mechanical devices. Lifting the bridge removes it from the path of objects that may be in floodwaters.

While the wheel assembly is out of the water, maintenance including greasing the bearings on the speed increaser and wheel can be accomplished using food grade grease.

To return to power generation, the system is deployed in the following way: First the drawbridge is lowered into its cradle and rests in the horizontal position. Second, the crane holding wheel/pontoon assembly (wheel, pontoons, speed increaser and generator) and screen, is swung from its safe location above the waterline back to a position parallel to the drawbridge. The cross links between the bridge and the crane are linked and the stabilizing pin is then inserted from the base of the crane into the deck of the service hull on the anchor, securing the crane parallel to the bridge. The robust bridge stabilizes the crane and the screen from being pushed downstream, and provides resistance to torque while the wheel turns. Third, the screen is transferred from the crane to its position on the drawbridge. Fourth, the wheel assembly (wheel, pontoons, speed increaser and generator) are lowered into the water and power generation is resumed.

Special Cases

I. Mechanical Power

If the invention is to be used for mechanical power, the system would generate electricity as above, which would be used to power an electric pump to pump river water up to a holding tank. This water would then be used to power a turbine or traditional overshot wheel in a flume that would feed the water back to the river. The rotation of the turbine or overshot wheel would turn a shaft that could be used for direct mechanical power.

II. Multiple Wheels

It would be possible in some locations to place a number of wheels in series downstream of a single drawbridge. Each would require its own crane, especially where the flow of the river or stream is unregulated. Alternately, many wheels could be deployed on the same axis on very wide rivers, necessitating a wide bridge and crane.

III. Use of Fixed Bridges

The protective screen could be attached to a fixed bridge, with the crane and wheel(s) positioned downstream.

IV. Funnel

A funnel may be added, attached to the bridge, with solid walls leading to the wheel work area. In low water conditions the funnel will cause an acceleration of water from the bridge to the wheel and also aid in keeping fish and other creatures out of the wheel's path.

V. Tidal Areas

In tidal areas where water flows in alternating directions, the rotation of the invention will allow for power generation from the water flow in both directions. A second anchor to accommodate a second drawbridge is required. The two bridges could both be anchored perpendicular to the tidal flows and hold protective screens in order to shield the wheel from debris in either of two work locations. The anchors would be parallel to each other and parallel to the direction of the water's movement. The ends of the bridges point in the same direction. One bridge, used while the water is flowing away from land, would share an anchor with the crane. This anchor is located in the center of the "work area" and the bridge is mounted inland from the crane. The second bridge would be located further from land, and anchored on the perimeter of the work area, "upstream" when the tide is flowing towards land. The use of a second anchor allows the second bridge to be raised and allow the crane, wheel and pontoons to pass under it as the crane rotates 180 degrees with the shift of the tide. In areas subject to ocean storms, a protective shell that covers the wheel and pontoon assembly may be required.

Figure 2:
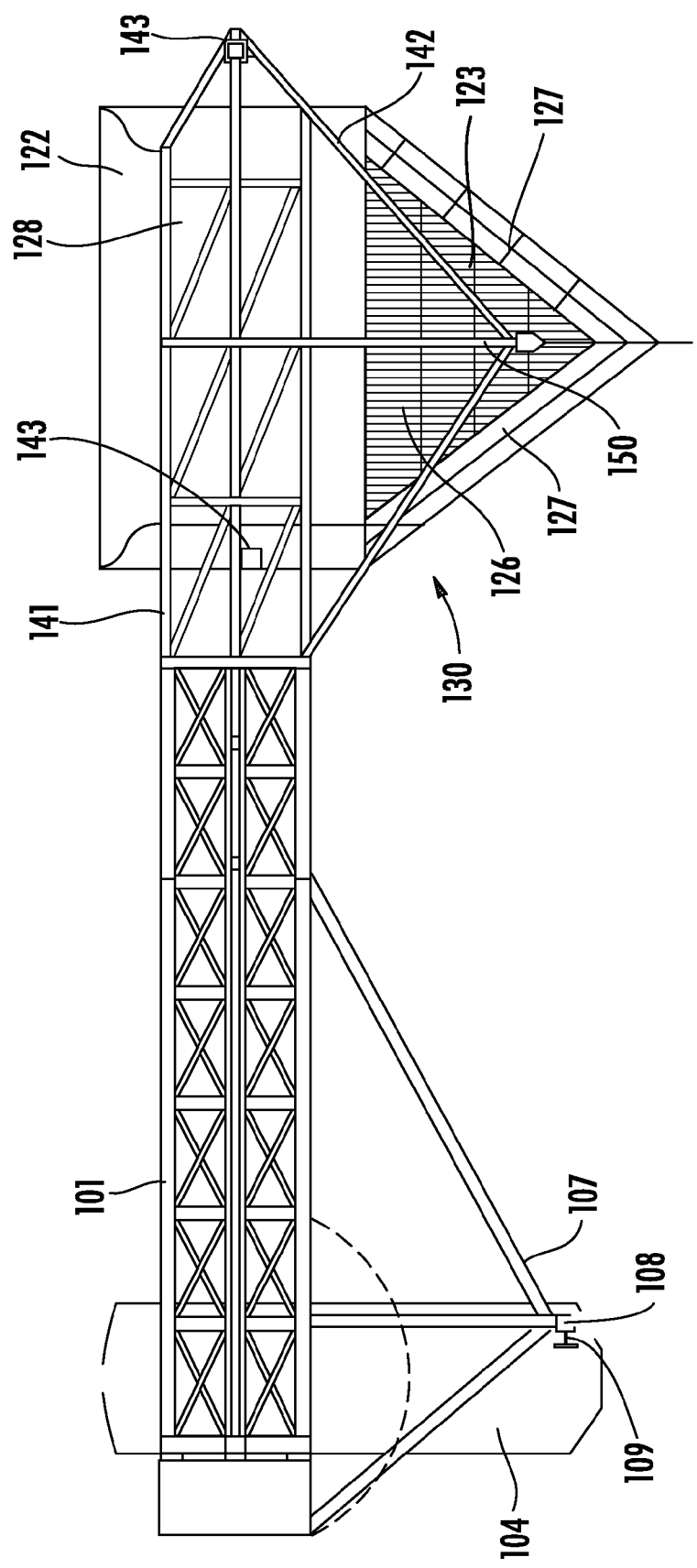
FIG. 2 is a top plan view of the system shown in FIG. 1.
Figure 3:
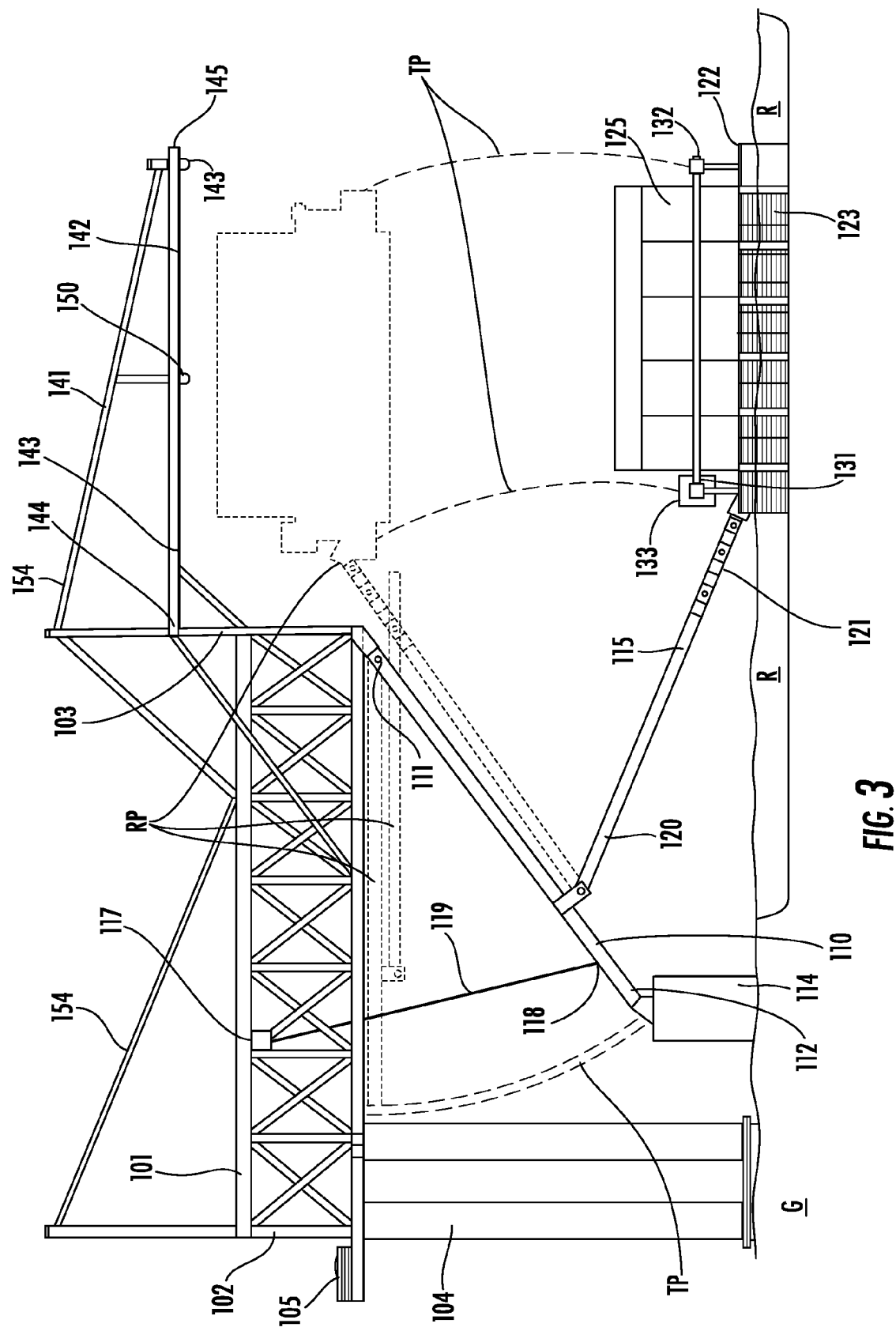
FIG. 3 is a side elevational view of the system shown in FIG. 1.

With reference to FIGS. 1 through 3, a hydropower generating system embodying the invention is shown broadly at reference numeral 100 in conjunction with the ground "G" and a river "R". As herein, the term "river" is defined in accordance with the definition of "river" adopted by the United States Geological Survey. The system 100 includes an arm assembly 116 and a platform 122 suspended therefrom. The arm assembly 116 is rotatably mounted on an anchor 104 adjacent to the river "R" and connects the anchor to the platform 122. The arm assembly 116 includes a plurality of arms, namely a crane 101, a crane support frame 107 (FIG. 2), a brace 110, a platform stabilization arm 115 attached to the platform 122, a crane extension 141, and a platform suspension frame 142. The arm assembly 116 swings along a 180-degree arc facing downstream, from a position substantially perpendicular to and over the river to a position substantially perpendicular to the river and over the riverbank.

The crane 101 has a proximal end 102 and a distal end 103. The proximal end 102 of the crane 101 is provided with a counterweight 105. The distal end 103 of the crane 101 has an underside 113 and an upper side 106. The crane support frame 107 extends from the crane 101 such that when the crane 101 is over and substantially perpendicular to the river "R", the crane support frame 107 faces upstream. A distal portion 108 of the crane support frame 107 is secured to a stop column 109 on the anchor 104 when the crane 101 is over and substantially perpendicular to the river "R".

The brace 110 has a proximal end 111 and a distal end 112 and extends downward from the underside 113 of the distal end 103 of the crane 101 to a brace anchor 114 resting on the ground "G" and/or secured to bedrock (not shown). The distal end 112 of the brace 110 is secured to the brace anchor 114. A brace winch 117 (FIG. 3) is mounted on the crane 101. A free end 118 (FIG. 3) of a cable 119 (FIG. 3) associated with the brace winch 117 is coupled to the brace 110. The platform stabilization arm 115 has a proximal end 120 and a distal end 121 and extends from the brace 110 at a point adjacent to the distal end 112 of the brace 110. The distal end 121 of the platform stabilization arm 115 is secured to the platform 122. The brace 110 and the platform stabilization arm 115, among other structures, cooperate to stabilize the platform 122 when the platform 122 is in the river "R".

The platform 122 includes two opposing pontoons 124, a waterwheel 125 extending between and secured to the opposing pontoons 124, a bumper screen 123 upstream from the waterwheel 125 having a floor 126 and two walls 127, and a floor 130. The walls 127 of the bumper screen converge upstream in a "V" configuration. The floor 130 of the platform 122 includes an impervious or solid portion 128 beneath the waterwheel 125 and a substantially coplanar portion 126 defined by the floor 126 of the bumper screen 123. The rotational axis of the waterwheel 125 is in substantially perpendicular relation to the pontoons 124. A proximal shaft portion 131 (FIG. 3) and a distal shaft portion 132 extend from respective ends of the waterwheel 125. The proximal shaft portion 131 of the waterwheel 125 is coupled to a gearbox 133, which in turn is coupled to a generator (not shown). An electrical cable (not shown) extends from the generator to a power processing unit (not shown) on land. Alternatively, in order to better balance the platform 122, instead of the single waterwheel 125, two independently rotating waterwheels (not shown) may be mounted for rotation on respective coaxial shafts (not shown) supported by the platform 122, each of the shafts driving a respective gearbox (not shown) and a respective generator (not shown), with an electrical cable (not shown) extending from each generator. In this manner, each of the opposing pontoons 124 will carry substantially equal weight, thereby better balancing the platform 122, and in addition, dual generators will be provided.

A platform suspension assembly 140 extends upward and outward from the upper side 106 of the distal end 112 of the crane 101. The platform suspension assembly 140 includes the crane extension 141 and the platform suspension frame 142 extending from the crane extension 141. When the crane 101 and the crane extension 141 are over and substantially perpendicular to the river "R", the platform suspension frame 142 faces upstream, as does the bumper screen 123 of the platform 122 below. The crane extension 141 carries two spaced-apart platform winches 143 (FIG. 3), one adjacent to a proximal end 144 (FIG. 3) of the crane extension 141 and one adjacent to a distal end 145 (FIG. 3) of the crane extension 141. A third platform winch 150 is carried on a distal portion 151 of the platform suspension frame 142. Each of the three winches 143, 150 is provided with a cable 152 (FIG. 1) having a free end 153 (FIG. 1) coupled to the platform 122. The crane extension 141 and the crane 101 define a bay for receiving the platform 122 when the platform 122 is raised out of the river "R".

Jibs 154 are attached to and support the crane 101 and the crane extension 141. The platform stabilization arm 115, the brace 110, the crane 101, and the crane extension 141, together with handrails (not shown) on those components, form a walkway to enable human access to the various system components for maintenance and inspection purposes.

The three platform winches 143, 150 and the brace winch 117 cooperate to raise and lower the platform 122, the brace 110, and the platform stabilization arm 115 such that the platform 122 may be positioned within or without the river "R", as desired during system operation. Looking specifically at FIG. 3, raised positions "RP" of the platform 122, the brace 110, and the platform stabilization arm 115 as well as travel paths "TP" of the platform 122 and the brace 110 are shown in phantom. The brace anchor 114 remains on the ground "G" when the brace 110 is raised by the brace winch 117. The connections between the crane 101 and the brace 110, the brace 110 and the platform extension arm 115, and the platform extension arm 115 and the platform 122 are hinged to enable the illustrated movement of those components relative to one another, for instance to accommodate rising and falling water levels of the river "R" by varying the level of the platform 122 directly with the level of the river.

To operate the system 100, the arm assembly 116 is rotated to a position over and substantially perpendicular to the river "R". The three platform winches 143, 150 and the brace winch 117 then cooperate with the brace 110 and the platform extension arm 115 to lower the platform 122 into the river "R". The platform 122 may be oriented for optimal actuation of the waterwheel 125 by the river "R". In light of the buoyancy of the pontoons 124, the platform 122 rises and falls in response to rising and falling water levels of the river "R", that is, the level of the platform 122 varies directly with the level of the river "R" by rising as and to a substantially similar degree that the level of the river "R" rises and falling as and to a substantially similar degree that the level of the river "R" falls. The water in the river "R" is filtered as it flows through the bumper screen 123 toward the waterwheel 125. In addition, the walls 127 of the bumper screen 123 converge upstream from the remainder of the platform 122 such that logs and other large debris in the river "R" are deflected and directed around the platform 122, away from the waterwheel 125, and down the river "R". The water current rotates the waterwheel 125 and the shafts 131, 132 thereon. The rotation of the proximal shaft 131 of the waterwheel 125 drives the gearbox 133, which in turn drives the generator (not shown), thereby transmitting an electrical current down the electrical cable (not shown). Alternatively, as discussed above, dual waterwheels, shafts, gearboxes, generators, and cables may be employed. When desired, the winches 117, 143, 150 may raise the platform 122 out of the river "R" and the arm assembly 116 may be rotated along the 180-degree downstream arc to a position substantially parallel to the river "R" or substantially perpendicular to the river "R" and over the riverbank. A bank brace anchor (not shown) may be provided to support the brace 110 when the arm assembly 116 is above the bank instead of the river "R".

Figures 4A, 4B:
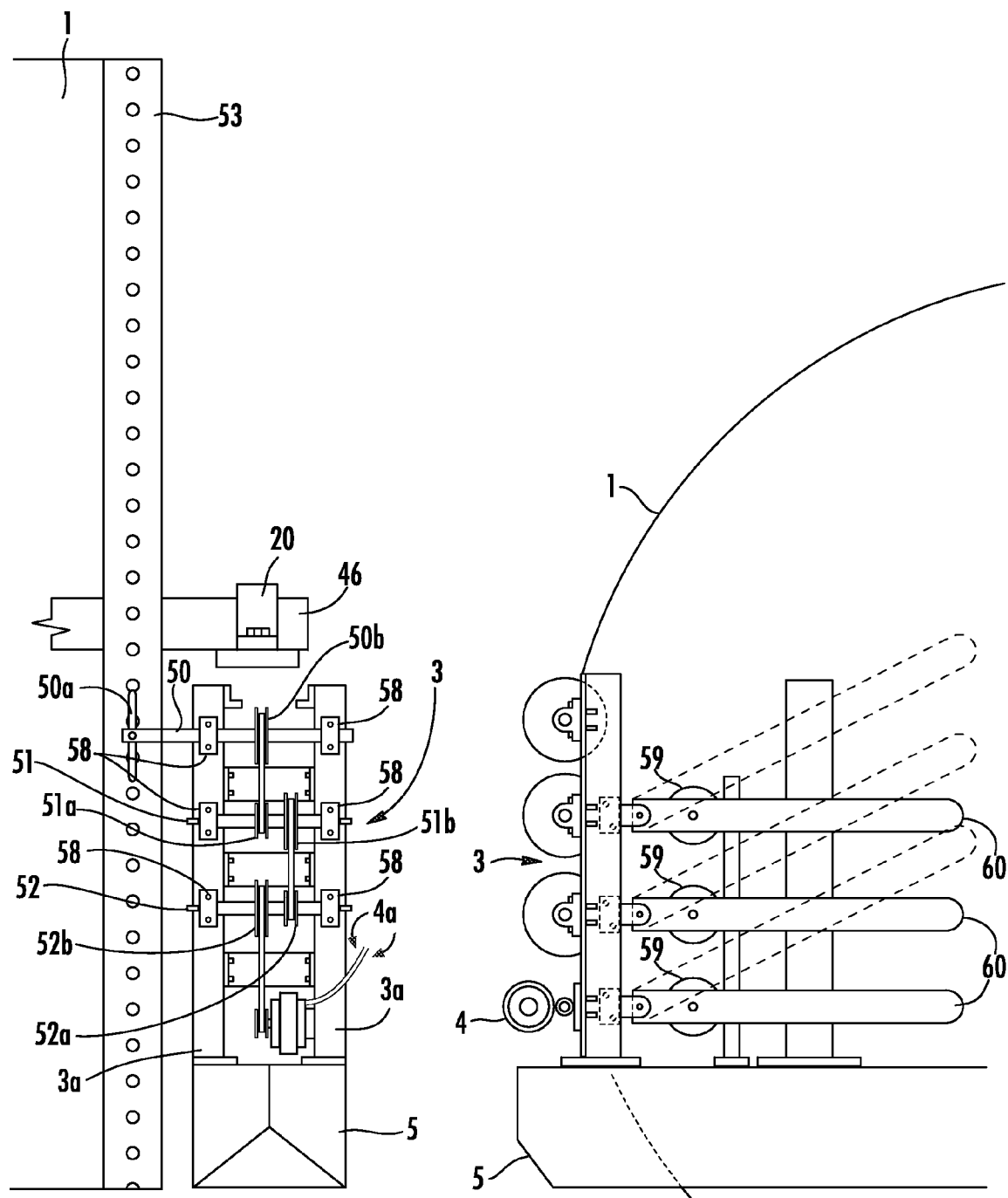
FIG. 4A is an end view of a speed increaser.
FIG. 4B is a side elevational view of the speed increaser of FIG. 4A.

FIGS. 4a and 5b show details of a speed increaser 3. The function of the speed increaser is to step up the revolutions per minute from the large wheel in the water to the rate needed to operate the generator(s) 4 or alternator(s). The speed increaser 3 is located on the landward pontoon 124 with small sprocket gear 50a engaged with the stainless ring gear 53 on the landward edge of the wheel 125 (not shown). The sprocket gear shaft 50 has a large pulley 50b, which carries a belt that links to a very small pulley 51a on a second shaft 51. The second shaft 51 also has a large pulley 51b that is linked to a very small pulley 52a on a third shaft 52. This pattern is repeated one more time on the third shaft 52 where the large pulley 52b and belt link to the generator(s) 4 or alternator(s) for the production of electricity, transmitted by wires 4a. Each shaft rides on pillow block bearings 58, two per shaft attached to the speed increaser supports 3a. This view also shows the pillow block bearing 20 for the wheel and the wheel axle 46, but lifting lug 21 is not shown. FIG. 4B shows idler pulleys 59 and handles 60 needed to tighten the speed increaser belts. The release position of each idler pulley handle is shown in phantom lines. As stated above, in large installations the speed increaser may be replaced by a gearbox that performs the same function. Such an assembly should be lubricated with food-grade oils.

From the foregoing description of the preferred embodiments of the invention, it will be apparent that many modifications may be made therein. It will be understood, however, that the embodiments of the invention are an exemplification of the invention only in that the invention is not limited thereto. It is to be understood, therefore, that it is intended that the appended claims cover all such modifications as fall within the true spirit and scope of the invention.

What is claimed is:

1. A hydro-power generating system, comprising:
   a platform floating on a river, the platform comprising
      a waterwheel which rotates on a horizontal axis, the horizontal axis being above the level of the river,
      a solid platform floor portion beneath the waterwheel, and
      a bumper screen upstream from the waterwheel for deflecting and filtering waterborne objects.

2. A hydro-power generating system according to claim 1, wherein the bumper screen comprises a floor portion that forms a portion of the floor of the platform and is substantially coplanar with the solid floor portion beneath the waterwheel.

3. A hydro-power generating system according to claim 2, wherein the bumper screen further comprises two walls, wherein the two walls of the bumper screen converge upstream from the remainder of the platform in a "V" configuration.

4. A hydro-power generating system according to claim 1, further comprising an anchor adjacent to the river and an arm assembly connecting the anchor to the platform, the arm assembly comprising a plurality of arms connected together such that the level of the platform may vary directly with the level of the river.

5. A hydro-power generating system according to claim 4, wherein the arm assembly is configured to swing about the anchor to any position along a 180-degree downstream arc extending from a position substantially perpendicular to and over the river to a position substantially perpendicular to and over the riverbank.

6. A hydro-power generating system according to claim 4, wherein a plurality of winches extending down toward the river from the arm assembly are configured to remove the waterwheel from the river.

7. A hydro-power generating system according to claim 4, wherein the arm assembly defines a bay for receiving the platform when the platform is not in the river.

8. A hydro-power generating system according to claim 1, further comprising a walkway extending to the platform.

9. A hydro-power generating system according to claim 1, wherein the platform further comprises a plurality of pontoons oriented in substantially perpendicular relation to the rotation axis of the waterwheel.

\* \* \* \* \*